United States Patent
Jiang et al.

(10) Patent No.: US 11,735,775 B2
(45) Date of Patent: Aug. 22, 2023

(54) SECONDARY BATTERY, ELECTROLYTE, AND APPARATUS COMPRISING THE SECONDARY BATTERY

(71) Applicant: Contemporary Amperex Technology Co., Limited, Ningde (CN)

(72) Inventors: Bin Jiang, Ningde (CN); Changlong Han, Ningde (CN); Chenghua Fu, Ningde (CN); Rui Shen, Ningde (CN); Yuanyuan Li, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 68 days.

(21) Appl. No.: 17/402,672

(22) Filed: Aug. 16, 2021

(65) Prior Publication Data

US 2022/0123366 A1 Apr. 21, 2022

Related U.S. Application Data

(63) Continuation of application No. PCT/CN2019/122741, filed on Dec. 3, 2019.

(51) Int. Cl.

| | |
|---|---|
| *H01M 10/0569* | (2010.01) |
| *H01M 4/133* | (2010.01) |
| *H01M 4/505* | (2010.01) |
| *H01M 4/525* | (2010.01) |
| *H01M 4/587* | (2010.01) |
| *H01M 10/0567* | (2010.01) |
| *H01M 4/02* | (2006.01) |

(52) U.S. Cl.
CPC ....... *H01M 10/0569* (2013.01); *H01M 4/133* (2013.01); *H01M 4/505* (2013.01); *H01M 4/525* (2013.01); *H01M 4/587* (2013.01); *H01M 10/0567* (2013.01); *H01M 2004/021* (2013.01); *H01M 2004/027* (2013.01); *H01M 2004/028* (2013.01); *H01M 2220/20* (2013.01); *H01M 2300/0037* (2013.01)

(58) Field of Classification Search
None
See application file for complete search history.

(56) References Cited

U.S. PATENT DOCUMENTS

| | | | | |
|---|---|---|---|---|
| 5,882,815 | A | * 3/1999 | Tagawa | ............... H01M 6/10 429/208 |
| 2002/0076619 | A1 | * 6/2002 | Yamada | ............ H01M 10/0567 429/324 |

FOREIGN PATENT DOCUMENTS

| | | |
|---|---|---|
| CN | 100365863 C | 1/2008 |
| CN | 103413970 A | 11/2013 |
| CN | 103560270 A | 2/2014 |
| CN | 104409771 A | 3/2015 |
| CN | 105047996 A | 11/2015 |
| CN | 105489857 A | 4/2016 |
| CN | 105514350 * | 4/2016 |
| CN | 106450458 A | 2/2017 |
| CN | 107154510 A | 9/2017 |
| CN | 105489857 B | 6/2018 |
| CN | 108807848 A | 11/2018 |
| CN | 109286020 A | 1/2019 |
| CN | 110247119 A | 9/2019 |
| CN | 110323487 A | 10/2019 |
| EP | 1675209 A1 | 6/2006 |
| EP | 1978587 A1 | 10/2008 |
| EP | 3442068 A1 | 2/2019 |
| EP | 3614462 A1 | 2/2020 |
| EP | 3793013 A1 | 3/2021 |
| JP | H0210666 A | 1/1990 |
| JP | 2009508302 A | 2/2009 |
| JP | 2010251315 A | 11/2010 |
| KR | 20150022660 A | 3/2015 |
| WO | WO2015/133366 * | 9/2015 |

OTHER PUBLICATIONS

Machine translation of CN 103413970, published on Nov. 27, 2013 (Year: 2013).*
Machine translation of WO 2015/133366, published on Sep. 11, 2015 (Year: 2015).*
Machine translation of CN 105514350, published on Apr. 20, 2016 (Year: 2016).*
Machine translation of CN105489857, published on Apr. 13, 2016 (Year: 2016).*
The First Office Action for Chinese Application No. 201980066194. 6, dated Oct. 10, 2022, 18 pages.
The International search report for PCT Application No. PCT/CN2019/122741, dated Sep. 7, 2020, 12 pages.
The extended European search report for EP Application No. 19954946.0, dated Mar. 1, 2022, 13 pages.
The First Office Action for Indian Application No. 202217009172, dated Jul. 19, 2022, 5 pages.
The First Office Action and search report dated Mar. 10, 2023 for Japanese Application No. 2022-512712, 6 pages.

* cited by examiner

*Primary Examiner* — Anca Eoff
(74) *Attorney, Agent, or Firm* — East IP P.C.

(57) ABSTRACT

The present application provides a secondary battery, an electrolyte, and an apparatus including the secondary battery. The secondary battery of the present application includes an electrolyte, characterized in that the electrolyte includes an organic solvent, and the organic solvent includes a cyclic carbonate and a chain carbonate; the mass ratio of the cyclic carbonate and the chain carbonate is from 25:75 to 32:68; the chain carbonate includes dimethyl carbonate; the mass percentage of the dimethyl carbonate in the chain carbonate is greater than or equal to 9 wt % and less than 50 wt %; wherein based on the total mass of the organic solvent, the mass percentage of a carboxylic acid ester is less than 5 wt %. The secondary battery of the present application can simultaneously obtain excellent low-temperature power, long service life and cycle performance.

19 Claims, 3 Drawing Sheets

SECONDARY BATTERY, ELECTROLYTE, AND APPARATUS COMPRISING THE SECONDARY BATTERY

This application is a continuation of International Application No. PCT/CN2019/122741, filed on Dec. 3, 2019.

TECHNICAL FIELD

The present application relates to the field of energy storage, in particular to a secondary battery, an electrolyte, and an apparatus comprising the secondary battery.

BACKGROUND

Due to the advantages of high energy density, long cycle life, safety and reliability, and no memory effect, secondary batteries have been widely used in various digital products, portable devices, electric vehicles, energy storage power supplies, etc.

With the widespread use of secondary batteries in recent years, higher requirements have been placed on secondary batteries. As the temperature of the operating environment decreases, the charge and discharge performance of the secondary battery will drop sharply. Moreover, with the charge and discharge cycle of the battery, the swelling of the battery increases, which in turn affects the cycle performance and service life of the battery.

SUMMARY

A first aspect of the present application relates to a secondary battery including an electrolyte, wherein the electrolyte includes an organic solvent, and the organic solvent includes a cyclic carbonate and a chain carbonate; a mass ratio of the cyclic carbonate to the chain carbonate is from 25:75 to 32:68; the chain carbonate includes dimethyl carbonate (also abbreviated as "DMC" herein); a mass percentage of the dimethyl carbonate in the chain carbonate is greater than or equal to 9 wt % and less than 50 wt %; and wherein a mass percentage of a carboxylic acid ester in the organic solvent is less than 5 wt %, based on the total mass of the organic solvent.

A second aspect of the present application relates to an electrolyte, wherein the electrolyte includes an organic solvent, the organic solvent includes a cyclic carbonate and a chain carbonate; a mass ratio of the cyclic carbonate to the chain carbonate is from 25:75 to 32:68; the chain carbonate includes dimethyl carbonate; a mass percentage of the dimethyl carbonate in the chain carbonate is greater than or equal to 9 wt % and less than 50 wt %; and wherein a mass percentage of a carboxylic acid ester in the organic solvent is less than 5 wt %, based on the total mass of the organic solvent.

A third aspect of the present application relates to an apparatus including the secondary battery of the first aspect of the present application.

The inventors of the present application found that by specifically controlling the ratio of cyclic carbonate to chain carbonate in the electrolyte and at the same time specifically controlling the content of dimethyl carbonate in the chain carbonate, the secondary battery can have both excellent low-temperature power and cycle performance at 45° C. In addition, the inventors discovered that when the electrolyte meets the above conditions, the amount of carboxylic acid ester needs to be strictly controlled. When the content of the carboxylic acid ester is not within the range given in the present application, the cycle performance of the battery is seriously affected. It can be seen that in the present application, by simultaneously controlling the ratio of cyclic carbonate to chain carbonate, the content of dimethyl carbonate in chain carbonate, and the amount of carboxylic acid ester, the secondary battery exhibits excellent low-temperature power and cycle performance. The apparatus of the present application includes the secondary battery provided by the present application, and thus has at least the same advantages as the secondary battery.

DESCRIPTION OF THE DRAWINGS

In order to explain the technical solutions of the embodiments of the present application more clearly, the following will briefly introduce the drawings that need to be used in the embodiments of the present application. Obviously, the drawings described below are only some embodiments of the present application. A person of ordinary skill in the art can obtain other drawings based on the drawings without creative work.

Figure 1:
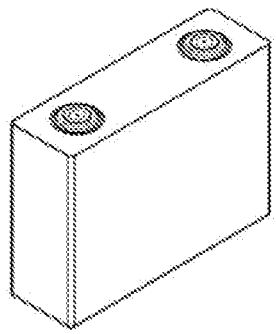
FIG. 1 is a schematic diagram of a secondary battery provided by an embodiment of the present application.

Among them, the reference signs are explained as follows:

1. Battery pack;
2. Upper case body;
3. Lower case body;
4. Battery module;
5. Secondary battery.

DETAILED DESCRIPTION

In order to make the object, technical solution, and technical effects of the present application apparent, the following further describes the present application in detail with reference to the embodiments. It should be understood that the embodiments described in the present description are only for explaining the present application, and are not intended to limit the application.

Throughout the present application, where compositions are described as having, including, or comprising specific components or fractions, or where processes are described as having, including, or comprising specific process steps, it is contemplated that the compositions or processes as disclosed herein may further comprise other components or fractions or steps, whether or not specifically mentioned in this disclosure, as long as such components or steps do not affect the basic and novel characteristics of the invention, but it is also contemplated that the compositions or processes may consist essentially of, or consist of, the recited components or steps.

For the sake of brevity, only certain numerical ranges are explicitly disclosed herein. However, any lower limit may be combined with any upper limit to form a range that is not explicitly described; and any lower limit may be combined with other lower limits to form an unspecified range, and any upper limit may be combined with any other upper limit to form an unspecified range. Further, although not explicitly specified, each point or single value between the endpoints of the range is included in the range. Thus, each point or single value can be combined with any other point or single value or combined with other lower or upper limits to form a range that is not explicitly specified.

In the description herein, it should be noted that, unless otherwise stated, the recitation of numerical ranges by "no less than" and "no more than" include all numbers within that range including the endpoints. As used herein, "a", "an", "the", "at least one", and "one or more" are used interchangeably, unless indicated otherwise and the recitation of "more" in the phrase "one or more" includes two or more.

The terms "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present application.

The above summary of the present application is not intended to describe each disclosed embodiment or every implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

[Secondary Battery]

The secondary battery provided by the first aspect of the present application comprises an electrolyte, characterized in that, the electrolyte comprises an organic solvent, and the organic solvent comprises a cyclic carbonate and a chain carbonate; the mass ratio of the cyclic carbonate to the chain carbonate is from 25:75 to 32:68; the chain carbonate comprises dimethyl carbonate; the mass percentage of the dimethyl carbonate in the chain carbonate is greater than or equal to 9 wt % and less than 50 wt %; wherein the mass percentage of the carboxylic acid ester in the organic solvent is less than 5 wt %, based on the total mass of the organic solvent.

As used herein, the term "organic solvent" may have a meaning commonly understood in the battery field. Generally speaking, the term "organic solvent" can be understood as a non-aqueous aprotic solvent that can be used as a carrier for active ions in a battery. For example, the organic solvent comprises a cyclic carbonate, a chain carbonate, a carboxylic acid ester, and the like.

In some embodiments, the cyclic carbonate comprises one or more of ethylene carbonate (also abbreviated as "EC" herein), propylene carbonate (also abbreviated as "PC" herein) and butylene carbonate (also abbreviated as "BC" herein); preferably, the cyclic carbonate comprises ethylene carbonate.

In some embodiments, the chain carbonate further comprises one or more of diethyl carbonate (also abbreviated as "DEC" herein) and ethyl methyl carbonate (also abbreviated as "EMC" herein); preferably, the chain carbonate further comprises ethyl methyl carbonate.

The inventors of the present application found that the relative content of cyclic carbonate and chain carbonate needs to be limited to a specific range. Without wishing to be limited by theory, on the one hand, the excessive cyclic carbonate not only causes the viscosity of the electrolyte to increase at low temperatures, but also affects the low-temperature conductivity of the electrolyte, and reduces the low-temperature charge and discharge power of the battery. In addition, the excessive cyclic carbonate may undergo oxidation reaction on the positive electrode, causing the battery's gas production to increase, which affects the charging interface, deteriorates the charging ability, and then affects the cycle performance at 45° C. On the other hand, under the condition that the proportion of cyclic carbonate is too small, the electrolyte's ability to dissociate the electrolyte salt will decrease, which will affect the high-temperature conductivity of the electrolyte, resulting in greater polarization during the battery cycle at 45° C., and the swelling force will lead to deterioration of cycle performance. The inventors have discovered through a lot of experiments and research that the mass ratio of cyclic carbonate to chain carbonate should be controlled in the range of 25:75~32:68, which can favorably balance the high-temperature and low-temperature conductivity of the electrolyte, so that the battery can obtain excellent cycle performance at 45° C. and low-temperature power performance.

In some preferred embodiments, the mass percentage of ethylene carbonate in the cyclic carbonate is greater than 90%, preferably from 92% to 100%. The inventors found that ethylene carbonate has a film-forming protective effect on the negative active material, and controlling its content within a given range can further improve the cycle performance of the battery. Particularly preferably, the mass percentage of ethylene carbonate in the cyclic carbonate is greater than or equal to 94%, and even more preferably greater than or equal to 98%. For example, in some preferred embodiments, the mass percentage of ethylene carbonate in the cyclic carbonate even reaches 100%.

In some preferred embodiments, the mass percentage of dimethyl carbonate in the chain carbonate is from 10 wt % to 48 wt %, more preferably from 15 wt % to 45 wt %. In an exemplary embodiment, the mass percentage of dimethyl carbonate in the chain carbonate may be about 14 wt %, 18 wt %, 20 wt %, 25 wt %, 30 wt %, 35 wt %, or 40 wt %. The inventors found that by using the amount of dimethyl carbonate defined herein, good low-temperature conductivity and cycle performance at 45° C. can be obtained. The addition of a specific content of dimethyl carbonate in the electrolyte effectively alleviates the deterioration of the charging ability caused by the increase of the swelling force of the battery during the cycle, which is beneficial to inhibiting the increase of the swelling force in the battery, and thus is beneficial to improving the cycle performance of the battery. However, excessive dimethyl carbonate causes the low-temperature conductivity and low-temperature power of the electrolyte to decrease significantly. In addition, the decomposition of excessive dimethyl carbonate at the interface of the positive electrode increases gas production, resulting in severe flatulence of battery, especially severely deteriorating the cycle performance at 45° C. of the battery.

In some embodiments, the carboxylic acid ester may comprise one or more of methyl acetate, ethyl acetate, propyl acetate, methyl propionate, ethyl propionate, and propyl propionate. Specifically, the carboxylic acid ester may comprise one or more of ethyl acetate and ethyl propionate. Generally speaking, compared with chain carbonates, carboxylic acid esters have the advantages of low viscosity and high dielectric constant, and their conductivity at room temperature and low temperature is usually higher than that of carbonate solvents. However, the inventors found that the addition of a carboxylic acid ester to the electrolyte of the present application having a specific composition would destroy the structural stability of the SEI film on the surface of the graphite negative electrode, resulting in deterioration of cycle performance. The inventors found through experiments that based on the total mass of the organic solvent, when the mass percentage of the carboxylic acid ester in the organic solvent is less than 5 wt %, the deterioration of the battery performance by the carboxylic acid ester is suppressed. In some preferred embodiments, based on the total mass of the organic solvent, the electrolyte comprises 3 wt % or less of a carboxylic acid ester. Even more preferably, based on the total mass of the organic solvent, the organic solvent does not comprise a carboxylic acid ester (i.e., the mass percentage of the carboxylic acid ester in the organic solvent is 0 wt %).

In some preferred embodiments, the electrolyte has a conductivity of at −20° C. of more than or equal to 2.5 mS/cm. More preferably, the electrolyte has a conductivity of at −20° C. of 2.6 mS/cm to 3.5 mS/cm. For example, the conductivity at −20° C. of the electrolyte may be about 2.6 mS/cm, 2.8 mS/cm, 3.0 mS/cm, 3.2 mS/cm, or 3.4 mS/cm.

In some preferred embodiments, the electrolyte may further comprise an additive. The additive comprises, but are not limited to, one or more of fluoroethylene carbonate (FEC), vinylene carbonate (VC), ethylene sulfate (i.e. 1,3, 2-dioxathiolane 2,2-dioxide, abbreviated as DTD), tris(trimethylsilyl) phosphate (TMSP), lithium difluoro(oxalate)borate (LiDFOB) and lithium bis(fluorosulfonyl)imide (LiFSI). The above additive can further improve the chemical stability of the electrolyte, improve the film formation stability of the positive electrode and negative electrode interfaces, and modify the lithium ion transmission path of the interface film to have a lower interface impedance and to repair the positive and negative interfaces during the battery life cycle. In addition, the inventors found that for battery performance, it is possible to comprehensively improve the battery's room-temperature/low-temperature power, room-temperature/high-temperature cycle performance, room-temperature/high-temperature storage life, high-temperature storage gas production, and room-temperature/low-temperature fast charging capabilities.

In some preferred embodiments, the total amount of the additives does not exceed 10 wt % of the total mass of the electrolyte. Based on the total mass of the electrolyte, the amount of each additive component may be 0.05-5 wt %, preferably 0.1-3 wt %. For example, based on the total mass of the electrolyte, the amount of each additive component may be 0.1 wt %, 0.3 wt %, 0.5 wt %, 1 wt %, 1.5 wt %, 2 wt %, or 2.5 wt %. An unduly small amount of additive will lead to incomplete film formation at the electrode interface and unstable structure; an excessively large amount of additives will increase the resistance of the film formation or the redox decomposition of the residual additive will cause battery flatulence.

The electrolyte described in the present application further comprises an electrolyte salt as a solute. As an example, the electrolyte salt may be one or more selected from $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), $Li(CF_3SO_2)_2N$, LiFSI (lithium bis(fluorosulfonyl)imide), LiTFSI (lithium bistrifluoromethanesulfonimide), LiTFS (lithium trifluoromethanesulfonate), LiDFOB (lithium difluorooxalate borate), LiBOB (lithium dioxalate borate), $LiPO_2F_2$ (lithium difluorophosphate), LiDFOP (lithium difluorooxalatophosphate), and LiTFOP (lithium tetrafluorooxalate phosphate). In some preferred embodiments, as an electrolyte salt, one or more of $LiPF_6$, LiFSI, $LiPO_2F_2$, LiDFOB, and LiDFOP can be used.

In some specific embodiments, $LiPF_6$ can be used as the electrolyte salt. Preferably, based on the total mass of the electrolyte, the mass percentage of the electrolyte salt is at most 20%. More preferably, based on the total mass of the electrolyte, the mass percentage of the electrolyte salt is from 10% to 15%.

In the secondary battery of the present application, the secondary battery further comprises a negative electrode plate. The negative electrode plate comprises a negative active material, and the negative active material may be selected from materials known in the art that can be used as a negative active material. Preferably, the negative active material comprise an artificial graphite. When the negative active material comprises an artificial graphite, the improvement effect of the above-mentioned electrolyte is more significant.

When the negative active material comprises an artificial graphite, the performance of the battery can be further improved under the conditions that the artificial graphite further satisfies one or more of the following parameters.

In some preferred embodiments, the surface of the artificial graphite does not have an amorphous carbon coating layer; when the surface of the artificial graphite does not have an amorphous carbon coating layer, the side reaction between the artificial graphite and the electrolyte during the battery cycle can be further reduced, and the increase in the thickness of the SEI film is reduced, thereby reducing the cyclic expansion of the battery.

In some preferred embodiments, the $I_D/I_G$ of the artificial graphite is preferably less than or equal to 0.25. For example, the $I_D/I_G$ of artificial graphite may be 0.23, 0.2, 0.18, 0.16, 0.15, 0.12, 0.1 or 0.08. Preferably, the $I_D/I_G$ of artificial graphite is from 0.1 to 0.2. The inventors found that the use of artificial graphite having an $I_D/I_G$ in the above-mentioned preferred range can further reduce the volume expansion of the battery during the cycle. Without wishing to be limited by theory, the artificial graphite having a suitable the $I_D/I_G$ is beneficial to improving its surface stability and reducing side reactions of the electrolyte on its surface, thereby further reducing the volume expansion of the battery during the cycle.

The $I_D/I_G$ represents the ratio of the peak intensity ($I_D$) of Peak D of the artificial graphite to the peak intensity ($I_G$) of Peak G.

Peak D and Peak G are Raman characteristic peaks of graphite materials. The Peak D and Peak G of the artificial graphite can be measured by laser Raman spectroscopy, such as Advantage 785™ Raman spectrometer. In the Raman spectrum of the artificial graphite according to the present application measured by a Raman spectrometer, the Peak D is at the position of 1300 $cm^{-1}$ to 1400 $cm^{-1}$, and the Peak G is at the position of 1580 $cm^{-1}$ to 1620 $cm^{-1}$.

In some preferred embodiments, the artificial graphite further satisfies: a number average particle size $D_n10$ of 1 μm to 3 μm, preferably from 1 μm to 2 μm. When the artificial graphite having a number average particle size $D_n10$ in the above range is used, the gram capacity of the artificial graphite can be further increased; and in the negative electrode plate prepared from the artificial graphite, the artificial graphite and the additives such as the binder can be uniformly dispersed, the overall binding force of the electrode plate is relatively high, which can further reduce the cyclic expansion of the battery.

In some preferred embodiments, the artificial graphite further satisfies: a volume average particle size $D_v50$ of 15 μm to 20 μm, preferably from 15 μm to 18 μm.

In some preferred embodiments, the volume average particle size $D_v10$ of the artificial graphite is greater than or equal to 6 μm, preferably from 6.5 μm to 10.5 μm. For example, the $D_v10$ of the artificial graphite may be 6 μm or more, 6.5 μm or more, 7 μm or more, or 7.5 μm or more.

The artificial graphite having a $D_v50$ and/or $D_v10$ in the above range has higher active ion and electron transport performance, reducing side reactions of the electrolyte at the negative electrode; at the same time, it is also beneficial to improving its own powder compaction density.

In some preferred embodiments, the artificial graphite further satisfies: a particle size distribution $(D_v90-D_v10)/D_v50$ of 1.1 to 1.8, preferably from 1.2 to 1.5. When the artificial graphite further satisfies the particle size distribution within the given range, the cohesion between the particles can be improved, thereby reducing the expansion rate of the electrode plate of the battery during the cycle. In addition, the proper particle size distribution is also conducive to the proper specific surface area (SSA) of the artificial graphite, which enables it to have both higher electrochemical reaction activity and higher surface stability, thereby further improving cycle performance.

In the present application, the $D_n10$, $D_v10$, $D_v50$, and $D_v90$ of the artificial graphite can be measured with a laser particle size analyzer (such as Malvern Master Size 3000) with reference to the standard GB/T 19077.1-2016.

In the context, the physical definitions of $D_n10$, $D_v10$, $D_v50$, and $D_v90$ are as follows:

$D_n10$: the particle size when the cumulative number distribution percentage of the material reaches 10%;

$D_v10$: the particle size when the cumulative volume distribution percentage of the material reaches 10%;

$D_v50$: the particle size when the cumulative volume distribution percentage of the material reaches 50%;

$D_v90$: the particle size when the cumulative volume distribution percentage of the material reaches 90%.

In some preferred embodiments of the present application, the specific surface area (SSA) of the artificial graphite is from 1.0 m$^2$/g to 1.5 m$^2$/g. Without wishing to be limited by theory, artificial graphite having an appropriate specific surface area, can have a higher electrochemical reaction activity in secondary batteries, meet the kinetic requirements of secondary batteries, and at the same time can reduce side reactions of the electrolyte on the surface of the material, and reduce gas production, which can reduce the volume expansion of the battery during the cycle. Artificial graphite with appropriate specific surface area also has a strong bonding force with the binder, which can improve the cohesion and bonding force of the electrode plate, thereby further reducing the cyclic expansion of the battery.

The specific surface area of the artificial graphite can be measured using a method known in the art. For example, according to GB/T 19587-2017 (Determination of the specific surface area of solids by gas adsorption using the BET method), analysis of the specific surface area by the nitrogen adsorption can be used, and the specific surface area can be calculated by the BET (Brunauer Emmett Teller) method, in which the analysis of the specific surface area by the nitrogen adsorption can be carried out by a specific surface and pore size distribution analyzer (Type: Tri Star II 3020) from Micromeritics, USA.

In some preferred embodiments, the graphitization degree G of the artificial graphite may be from 90% to 95%, preferably from 92% to 94%. A suitable graphitization degree G can make the artificial graphite have a higher gram capacity and a higher phase structural stability at the same time.

The graphitization degree of the artificial graphite can be measured with a well-known method in the art. For example, the graphitization degree of the artificial graphite can be measured using an X-ray diffractometer (Bruker D8 Discover). The test can refer to JIS K 0131-1996, JB/T 4220-2011: measuring the size of $d_{002}$, and then calculating the graphitization degree according to the formula $G=(0.344-d_{002})/(0.344-0.3354)\times100\%$, in which $d_{002}$ is the interlayer spacing in the artificial graphite crystal structure, in nanometer (nm).

In some preferred embodiments, the artificial graphite has a powder compaction density under a pressure of 2000 kg of 1.65 g/cm$^3$ to 1.85 g/cm$^3$, preferably from 1.68 g/cm$^3$ to 1.83 g/cm$^3$. The artificial graphite has a higher powder compaction density under a pressure of 2000 kg, so that the negative electrode plate using such artificial graphite has a higher compaction density, thereby making the battery have a higher energy density.

The powder compaction density of the artificial graphite can be tested by a method known in the art. For example, refer to GB/T 24533-2009 and use an electronic pressure testing machine (such as UTM7305) to test.

In some preferred embodiments, the negative electrode film has a compaction density of 1.55 g/cm$^3$ to 1.75 g/cm$^3$; more preferably from 1.6 g/cm$^3$ to 1.7 g/cm$^3$. In this way, the negative electrode film can have a high compaction density and at the same time have a porosity suitable for full infiltration of the electrolyte. Therefore, the capacity of the battery can be used more effectively, and the battery can obtain better kinetic performance.

In some preferred embodiments, when the negative electrode film has a compaction density in the above-given range, the orientation OI value of the negative electrode plate is from 8 to 15, more preferably from 8 to 12. When the OI value of the electrode plate is within the given range, it can have a high degree of isotropy, so that the lithium intercalation-induced expansion of the artificial graphite in the electrode plate is distributed in all direction, thereby further reducing the volume expansion of the electrode plate and the battery during the cycle.

The orientation OI value of the negative electrode plate is the ratio of the peak area $C_{004}$ of the 004 diffraction peak of the negative active material to the peak area $C_{110}$ of the 110 diffraction peak in the X-ray diffraction pattern of the negative electrode plate. Therefore, the orientation OI value of the negative electrode plate=$C_{004}/C_{110}$. X-ray diffraction analysis can refer to the standard JISK 0131-1996, and use an X-ray diffractometer (such as Bruker D8 Discover X-ray diffractometer) for testing, in which CuKα rays are used as the radiation source, the ray wavelength is $\lambda=1.5406$ Å, the scanning angle range for 2θ is from 20° to 80°, and the scanning rate is 4°/min.

In some preferred embodiments, the areal density of the negative electrode film of the present application is from 7.5 mg/cm$^2$ to 14.0 mg/cm$^2$; preferably from 9.5 mg/cm$^2$ to 12.0 mg/cm$^2$. The areal density of the negative electrode film can represent the weight of the coating film per unit area on the electrode after cold pressing. The measurement can be carried out according to the method described in the embodiment, or can be carried out according to other well-known methods in the art. In some exemplary embodiments, the mass of the negative electrode film in a specific area is weighed by a standard balance, and then the mass of the negative electrode film per unit area, i.e. the areal density, is calculated.

It should be noted that the parameters of the negative electrode film (for example, the compaction density and areal density of the negative electrode film) given in the present application all refer to the parameter range of the single-sided film. When the negative electrode films are arranged on both surfaces of the current collector, as long as the parameters of the film on any one of the surfaces meet the requirements of the present application, it is considered to fall within the protection scope of the present application. In addition, the range of compaction density, areal density and the like in the present invention all refer to the parameter range after cold pressing and compacting for assembling a battery.

In some exemplary embodiments, the above-mentioned artificial graphite of the present application can be prepared by the following method:
(1) crushing green coke materials and classifying them;
(2) shaping the product obtained in step (1);
(3) granulating the product obtained in step (2), wherein the amount of binder added during the granulation process does not exceed 5% of the total weight of the green coke materials;
(4) subjecting the product obtained in step (3) to a graphitization treatment at a temperature of 2800° C.~3200° C. to obtain the artificial graphite.

In the above preparation method, preferably the green coke materials may be selected from one or more of green petroleum coke and green pitch coke, and more preferably comprises green petroleum coke.

In the above preparation method, preferably, the green coke material is non-needle coke.

In the above preparation method, preferably, the volatile content of the green coke material is from 7% to 10%. The volatile content of the green coke is appropriate, which can make the artificial graphite have a higher structure strength.

In the above preparation method, preferably, the sulfur content of the green coke material may be 2% or less. The green coke has a low sulfur content, which can improve the surface stability of artificial graphite.

In the above preparation method, preferably, the method further comprises removing fine powder after shaping in step (2). The $D_n10$ can be adjusted to be in an appropriate range through such a step.

In the above preparation method, preferably, the product obtained in step (2) can be granulated without adding a binder, which can further increase the gram capacity and structural strength of the artificial graphite.

In the above preparation method, preferably, the product obtained in step (3) is graphitized at a temperature of 2900° C. to 3100° C.

The secondary battery of the present application further comprises a positive electrode plate comprising a positive active material, and the positive active material can be selected from materials known in the art that can be used as a positive active material. Preferably, the positive active material comprises one or more of lithium transition metal oxides and modified materials thereof, and the modified material may be lithium transition metal oxide subjected to doping modification and/or coating modification. Preferably, the lithium transition metal oxide comprises one or more selected from lithium nickel manganese oxide and lithium nickel cobalt aluminum oxide. When the positive active material comprises the above-mentioned lithium transition metal oxide and the modified compound thereof, the improvement effect of the electrolyte is more obvious.

In the secondary battery of the present application, the positive electrode plate and the negative electrode plate may further optionally comprise a binder. The types of the binder are not specifically limited, and those skilled in the art can make selections according to actual needs. For example, the binder used for the positive electrode plate may comprise one or more of polyvinylidene fluoride (PVDF) and polytetrafluoroethylene (PTFE).

In the secondary battery of the present application, the positive electrode plate and the negative electrode plate may further optionally comprise a conductive agent. The types of the conductive agent are not specifically limited, and those skilled in the art can make selections according to actual needs. For example, the conductive agent used for the positive electrode plate may comprise one or more of artificial graphite, superconducting carbon, acetylene black, carbon black, Ketjen black, carbon dots, carbon nanotubes, artificial graphene, and carbon nanofibers.

The secondary battery of the present application further comprises a separator. The separator is located between the positive electrode plate and the negative electrode plate to play a role of isolation. The separator is not particularly limited, and any well-known porous structure separator having electrochemical stability and mechanical stability can be selected. In some embodiments, the separator may be one or more of glass fiber, non-woven fabric, polyethylene, polypropylene, and polyvinylidene fluoride. The separator may be a single-layer film or a multilayer film. When the separator is a multilayer film, the materials of each layer may be the same or different.

The secondary battery of the present application can be prepared according to a conventional method in the art. For example, the negative active material and optional conductive agent and binder are dispersed in a solvent (such as water) to form a uniform negative electrode slurry, and the negative electrode slurry is coated on the negative electrode current collector; after drying, cold pressing, etc., the negative electrode plate is obtained. The positive active material and optional conductive agent and binder are dispersed in a solvent (for example, N-methylpyrrolidone, abbreviated as NMP) to form a uniform positive electrode slurry, and the positive electrode slurry is coated on the positive electrode current collector, and the positive electrode piece is obtained after drying and cold pressing, and the like. The positive electrode plate, the separator, and the negative electrode plate are wound or laminated in order, so that the separator is located between the positive electrode plate and the negative electrode plate to play a role of isolation, so as to obtain a battery core; the battery core is placed in an outer packaging, which is then injected with electrolyte and sealed to obtain a secondary battery.

In some embodiments, the secondary battery may include an outer packaging and a battery core and electrolyte packaged in the outer packaging. The number of battery cores in the secondary battery can be one or more, which can be adjusted according to requirements.

In some embodiments, the outer packaging of the secondary battery may be a soft bag, such as a bag-type soft bag. The material of the soft bag can be plastic, such as one or more of polypropylene (PP), polybutylene terephthalate (PBT), and polybutylene succinate (PBS). The outer packaging of the secondary battery may also be a hard case, such as an aluminum case, or the like.

The present application does not particularly limit the shape of the secondary battery, which can be cylindrical, square or other arbitrary shapes. FIG. 1 shows a secondary battery 5 with a square structure as an example.

In some embodiments, the secondary battery can be assembled into a battery module, and the number of secondary batteries contained in the battery module can be multiple, and the specific number can be adjusted according to the application and capacity of the battery module.

Figure 2:
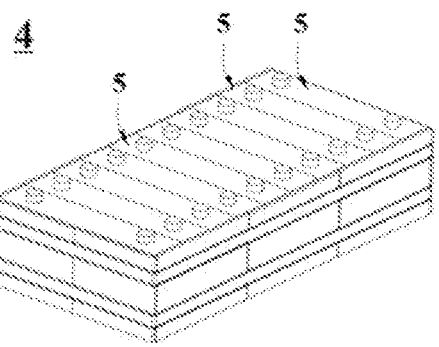
FIG. 2 is a schematic diagram of a battery module provided by an embodiment of the present application.

FIG. 2 shows a battery module 4 as an example. Referring to FIG. 2, in the battery module 4, a plurality of secondary batteries 5 may be disposed sequentially in the length direction of the battery module 4. Of course, the secondary batteries 5 may also be disposed in any other manner. Furthermore, the plurality of secondary batteries 5 may be fixed by fasteners.

Optionally, the battery module 4 may further comprise a housing with a receiving space, and the plurality of secondary batteries 5 are received in the receiving space.

In some embodiments, the above-mentioned battery module may also be assembled into a battery pack, and the number of battery modules contained in the battery pack can be adjusted according to the application and capacity of the battery pack.

Figure 3:
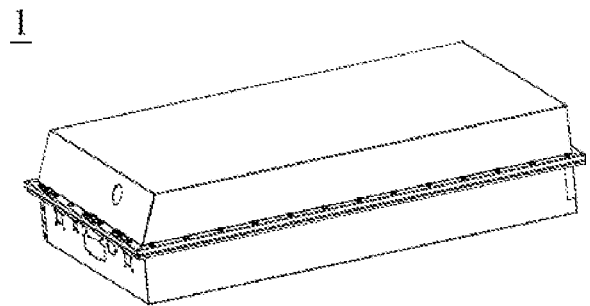
FIG. 3 is a schematic diagram of a battery pack provided by an embodiment of the present application.
Figure 4:
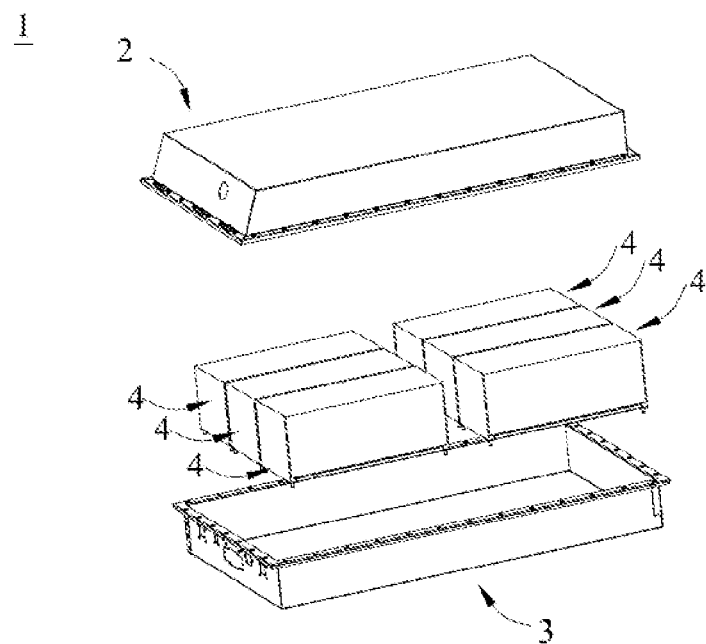
FIG. 4 is an exploded view of the battery pack as shown in FIG. 3.

FIGS. 3 and 4 show a battery pack 1 as an example. Referring to FIGS. 3 and 4, the battery pack 1 may comprise a battery case and a plurality of battery modules 4 disposed in the battery case. The battery case comprises an upper case body 2 and a lower case body 3. The upper case body 2 can cover the lower case body 3 to form a closed space for receiving the battery modules 4. A plurality of battery modules 4 can be disposed in the battery case in any manner.

Electrolyte

The present application also provides an electrolyte comprising an organic solvent. The organic solvent comprises a cyclic carbonate and a chain carbonate; the mass ratio of the cyclic carbonate to the chain carbonate is from 25:75 to 32:68; the chain carbonate comprises dimethyl carbonate; the mass percentage of the dimethyl carbonate in the chain carbonate is greater than or equal to 9 wt % and less than 50 wt %;

wherein based on the total mass of the organic solvent, the mass percentage of a carboxylic acid ester in the organic solvent is less than 5%.

The preferred embodiments of the components, the amounts thereof, etc. of the electrolyte are as discussed above, and are equally applicable to the electrolyte here, and constitute specific embodiments of the electrolyte. For the sake of brevity of the description, it will not repeat herein.

The electrolyte can be prepared according to a conventional method in the art. The organic solvent and the electrolyte salt and optional additives may be mixed uniformly to obtain the electrolyte. The addition order of each material is not particularly limited. For example, the electrolyte salt and optional additives are added to the organic solvent and mixed uniformly to obtain the electrolyte. The electrolyte salt can be added to the organic solvent first, and then the optional additives can be added to the organic solvent separately or at the same time.

[Apparatus]

The second aspect of the present application provides an apparatus, comprising the secondary battery according to the first aspect of the present application, and the secondary battery provides power to the apparatus. The apparatus may be, but is not limited to, a mobile apparatus (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf vehicle, an electric truck), an electric train, a ship, a satellite, an energy storage system, etc.

The apparatus may comprise the secondary battery, the battery module or the battery pack selected according to its usage requirements.

Figure 5:
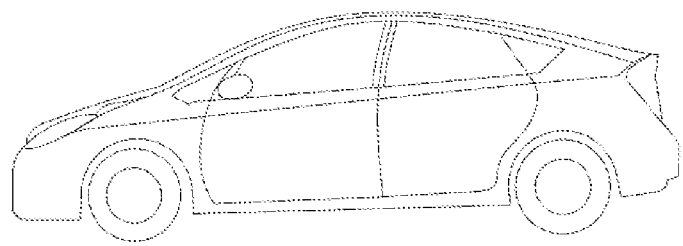
FIG. 5 is a schematic diagram of an apparatus provided by an embodiment of the present application.

FIG. 5 shows an apparatus as an example. The apparatus is a pure electric vehicle, a hybrid electric vehicle, or a plug-in hybrid electric vehicle. In order to meet the requirements of the apparatus for high power and high energy density of secondary batteries, the battery pack or battery module can be used.

As another example, the apparatus may be a mobile phone, a tablet computer, a notebook computer, etc. The apparatus is generally required to be thin and light, and the secondary battery can be used as a power supply.

EXEMPLARY EMBODIMENTS

Embodiment 1. A secondary battery comprising an electrolyte, characterized in that,
the electrolyte comprises an organic solvent, and the organic solvent comprises a cyclic carbonate and a chain carbonate;
a mass ratio of the cyclic carbonate to the chain carbonate is from 25:75 to 32:68;
the chain carbonate comprises dimethyl carbonate; a mass percentage of the dimethyl carbonate in the chain carbonate is more than or equal to 9 wt % and less than 50 wt %; and
based on the total mass of the organic solvent, a mass percentage of a carboxylic acid ester in the organic solvent is less than 5 wt %.

Embodiment 2. The secondary battery according to embodiment 1, characterized in that, the mass percentage of the dimethyl carbonate in the chain carbonate is from 15 wt % to 45 wt %, preferably from 25 wt % to 43 wt %.

Embodiment 3. The secondary battery according to embodiment 1 or 2, characterized in that, the mass percentage of the carboxylic acid ester in the organic solvent is less than 3 wt %, preferably the mass percentage of the carboxylic acid ester in the organic solvent is 0 wt %.

Embodiment 4. The secondary battery according to any of embodiments 1 to 3, characterized in that, the cyclic carbonate comprises one or more of ethylene carbonate and propylene carbonate.

Embodiment 5. The secondary battery according to any of embodiments 1 to 4, characterized in that, the mass percentage of the ethylene carbonate in the cyclic carbonate is more than 90 wt %, preferably from 92% to 100%.

Embodiment 6. The secondary battery according to any of embodiments 1 to 5, characterized in that, the chain carbonate further comprises one or more of diethyl carbonate and ethyl methyl carbonate.

Embodiment 7. The secondary battery according to any of embodiments 1 to 6, characterized in that, the carboxylic acid ester comprises one or more of methyl acetate, ethyl acetate, propyl acetate, methyl propionate, ethyl propionate, and propyl propionate; preferably, the carboxylic acid ester comprises one or more of ethyl acetate and ethyl propionate.

Embodiment 8. The secondary battery according to any of embodiments 1 to 7, characterized in that, the electrolyte further comprises an additive, and the additive comprises one or more of fluoroethylene carbonate, vinylene carbonate, ethylene sulfate, tris(trimethylsilyl) phosphate, lithium difluorooxalate borate, and lithium bis(fluorosulfonyl)imide.

Embodiment 9. The secondary battery according to embodiment 8, characterized in that, a total amount of the additive is no more than 10 wt %, based on the total mass of the electrolyte.

Embodiment 10. The secondary battery according to any of embodiments 1 to 9, characterized in that, the electrolyte has a conductivity at −20° C. of more than or equal to 2.5 mS/cm, preferably from 2.6 mS/cm to 3.5 mS/cm.

Embodiment 11. The secondary battery according to any of embodiments 1 to 10, characterized in that, the secondary battery further comprises a negative electrode plate, the negative electrode comprises a negative active material, the negative active material comprises an artificial graphite, and the artificial graphite satisfies one or more of the following (1)-(8):

(1) the artificial graphite has a gram capacity of 350 mAh/g to 358 mAh/g;

(2) the artificial graphite has a D peak intensity $I_D$ and a G peak intensity $I_G$ satisfying: $I_D/I_G \leq 0.25$, preferably, $0.1 \leq I_D/I_G \leq 0.2$ (3) the artificial graphite negative electrode material has a number average particle size $D_n10$ of 1 μm to 3 μm, preferably from 1 μm to 2 μm;

(4) the artificial graphite negative electrode material has a volume average particle size $D_v10$ of more than or equal to 6 μm, preferably from 6.5 μm to 10.5 μm;

(5) the artificial graphite negative electrode material has a volume average particle size $D_v50$ of 15 μm to 20 μm, preferably from 15 μm to 18 μm;

(6) the artificial graphite negative electrode material has a particle size distribution $(D_v90-D_v10)/D_v50$ of 1.1 to 1.8, preferably from 1.2 to 1.5;

(7) the artificial graphite has a specific surface area of 1.0 $m^2/g$ to 1.5 $m^2/g$;

(8) the artificial graphite has a graphitization degree G of 90% to 95%, preferably from 92% to 94%.

Embodiment 12. The secondary battery according to embodiment 11, characterized in that, the negative electrode plate has a compaction density of 1.55 $g/cm^3$ to 1.75 $g/cm^3$, preferably from 1.6 $g/cm^3$ to 1.7 $g/cm^3$.

Embodiment 13. The secondary battery according to embodiment 11 or 12, characterized in that, the negative electrode plate has an orientation OI value of 8 to 15, preferably from 8 to 12;

the orientation OI value of the negative electrode plate is the ratio of the peak area of 004 diffraction peak to the peak area of 110 diffraction peak of the negative active material in the X-ray diffraction pattern of the negative electrode plate.

Embodiment 14. The secondary battery according to any of embodiments 1 to 13, characterized in that, the secondary battery further comprises a positive electrode plate, the positive electrode plate comprises a positive active material, and the positive active material comprises one or more of lithium transition metal oxide and modified compounds thereof; preferably, the positive active material comprises one or more of lithium nickel cobalt manganese oxide and lithium nickel cobalt aluminum oxide.

Embodiment 15. An electrolyte, characterized in that, the electrolyte comprises an organic solvent, and the organic solvent comprises a cyclic carbonate and a chain carbonate;

a mass ratio of the cyclic carbonate to the chain carbonate is from 25:75 to 32:68;

the chain carbonate comprises dimethyl carbonate; a mass percentage of the dimethyl carbonate in the chain carbonate is more than or equal to 9 wt % and less than 50 wt %; and the mass percentage of the carboxylic acid ester in the organic solvent is less than 5 wt %, based on the total mass of the organic solvent.

Embodiment 16. An apparatus, characterized in that, the apparatus comprises the secondary battery according to any of embodiments 1 to 14.

EXAMPLES

The following examples more specifically describe the content disclosed in the present application, and these examples are only used for explanatory description, because various modifications and changes within the scope of the present disclosure are obvious to those skilled in the art. Unless otherwise stated, all parts, percentages, and ratios reported in the following examples are based on weight, and all reagents used in the examples are commercially available or synthesized according to conventional methods, and can be used directly without further treatment. Unless otherwise stated, the instruments used in the examples are all commercially available.

The negative active material used in the examples of the present application comprises:

(1) Artificial Graphite A: It can be Obtained Commercially, or it can be Prepared as Follows:

Calcined needle-liked petroleum coke was as raw material and subjected to crushing treatment; asphalt was used as a binder for granulation (the asphalt was added in an amount of 8%, based on the total weight of the calcined needle-liked petroleum coke raw material); then the materials were subjected to a graphitization treatment at a temperature of 2800° C. to 3000° C., then mixed with asphalt and subjected to a heat treatment at a temperature of 950° C. to 1200° C. to obtain artificial graphite A coated with amorphous carbon. Artificial graphite A had the following characteristics: a gram capacity of about 354 mAh/g, a volume average particle size $D_v50$ of about 12.8 μm, a volume average particle size $D_v10$ of about 6.9 μm, and a particle size distribution $(D_v90-D_v10)/D_v50$ of 1.26, an average particle size $D_n10$ of about 4.3 μm, $I_D/I_G$ of about 0.32, and SSA of about 0.95 $m^2/g$.

(2) Artificial Graphite B: It can be Prepared by the Aforementioned Method in the Present Application:

Use Non-needle green petroleum coke was used as raw material (volatile content of about 9.5%, sulfur content pf about 0.6%), crushed; granulated without binder, then graphitized at a temperature of 3000° C. to 3100° C. to obtain artificial graphite B. Artificial graphite B had the following characteristics: a gram capacity if about 354 mAh/g, a volume average particle size $D_v50$ of about 16.2 μm, a volume average particle size $D_v10$ of about 7.2 μm, and a particle size distribution $(D_v90-D_v10)/D_v50$ of about 1.37, an average particle size $D_n10$ of about 1.5 μm, $I_D/I_G$ of about 0.18, and SSA of about 1.25 $m^2/g$.

Example 1

(1) Preparation of Positive Electrode Plate

The positive active material $LiNi_{0.5}Co_{0.2}Mn_{0.3}O_2$, the conductive agent (Super P), and the binder polyvinylidene fluoride (PVDF) were fully stirred and mixed evenly at a mass ratio of 94:3:3 in N-methylpyrrolidone (NMP) to prepare a positive electrode slurry. Then, the positive electrode slurry was uniformly coated on the current collector Al foil, dried and cold pressed to obtain a positive electrode plate.

(2) Preparation of Negative Electrode Plate

The negative active material artificial graphite A, the conductive agent (Super P), the binder styrene-butadiene rubber (SBR), the thickener sodium carboxymethyl cellulose (CMC-Na) were fully stirred and mixed evenly at a mass ratio of 95:2:2:1 in deionized water to form a uniform a negative electrode slurry. Then, the negative electrode slurry was coated on the surface of a copper foil as the negative electrode current collector, dried and cold pressed to obtain a negative electrode plate. The negative electrode plate had a compaction density of 1.65 $g/cm^2$, an areal density of 10.7 $mg/cm^2$ and an orientation 01 value of 22.

(3) Separator

Polyethylene (PE) PE porous polymer film was used as a separator.

(4) Preparation of Electrolyte

In a glove box filled with argon gas, the components were mixed in the following dosage ratios shown in Table 1 and Table 2 to obtain an organic solvent mixture. Then, $LiPF_6$ electrolyte salt was added to the organic solvent mixture, in which the amount of the electrolyte salt was 13% based on the total mass of the electrolyte. Subsequently, functional additives (0.3 wt % of VC, 1 wt % of DTD, 1 wt % of TMSP, 0.5 wt % of LiDFOB, and 1 wt % of LiFSI) were added and mixed uniformly.

(5) Assembly of Secondary Battery

The above-mentioned positive electrode plate, the separator, and negative electrode plate were stacked in order, so that the separator was located between the positive electrode plate and the negative electrode plate to play a role of isolation. After winding, a bare battery core was obtained, and the tab was welded. The bare batter core was placed in the outer packaging, to which the electrolyte prepared above was then injected. After undergoing assembly, standing and forming, the battery was charged to 3.3V at a constant current of 0.02C, then charged to 3.6V at a constant current of 0.1C, shaped, and subjected to a capacity test to complete the battery preparation.

Examples 2-8 and Comparative Examples 1-8

The preparation steps of Examples 2-8 and Comparative Examples 1-8 were similar to those of Example 1, except for the composition and ratio of the organic solvent. The specific experimental parameters and results were shown in Table 1.

Example 9-16

In Examples 9-16, the same preparation steps as in Examples 1-8 were used respectively, except that the artificial graphite A was replaced with artificial graphite B during the preparation process of the negative electrode plate. The specific experimental parameters and results were shown in Table 2. It should be noted that during the preparation process of the negative electrode plate, when the artificial graphite B was used, the orientation OI value of the obtained negative electrode plate was 10.5.

Testing Method (1) Conductivity (mS/Cm)

A conductivity meter (Leici conductivity meter DDS-307A from INESA, Shanghai) was used to test the conductivity of the electrolyte at $-20°$ C.

(2) Cycle Performance at $45°$ C.

Five lithium-ion batteries of each example and comparative example were taken, and the lithium-ion batteries were repeatedly charged and discharged through the following steps, and the discharge capacity retention rate and the number of cycles of the batteries were calculated.

The battery was assembled into a steel plate clamp to perform cyclic charge and discharge, and the swelling force of the battery during the process was monitored.

In an environment of $45°$ C., the first charge and discharge was performed. A constant current and constant voltage charge at a charging current of 1C (i.e., the current value of the theoretical capacity completely discharged within 1 h) was performed until the upper limit voltage was 4.3V. Then, perform a constant current discharge at a discharging current of 1C was performed until the final voltage was 2.8V, and the first discharge capacity value was recorded. Subsequently, a continuous charge and discharge cycle was performed, the discharge capacity value during the cycle was recorded, and the cycle capacity retention rate was calculated.

The capacity retention rate of the $N^{th}$ cycle=(discharge capacity of the $N^{th}$ cycle/discharge capacity of the first cycle)×100%. When the cycle capacity retention rate dropped to 80%, the number of cycles of the battery was recorded.

(3) Discharge Power at $-20°$ C.

Five lithium ion batteries of each example and comparative example were taken, and the lithium ion batteries were charged and discharged through the following steps, and the discharge power was calculated.

First, the battery was placed at a constant temperature of $25°$ C. for 120 minutes to keep the temperature inside and outside the battery at $25°$ C. Then, the battery was charged at 1C rate constant current to 4.3V, and then was charged at 4.3V constant voltage to a current ≤0.05C. Then, the battery was discharged at a rate of 1C for 48 min at $25°$ C., so that the battery was maintained at a 20% SOC capacity.

Secondly, the battery was placed at $-20°$ C. for 120 minutes to keep the temperature inside and outside the battery constant at $-20°$ C., then was discharged with 400 W power for 10 seconds, and the discharge end voltage V was measured. When the terminal voltage V was within 2.1±0.05V, the current power was the power value of the battery, expressed in W.

If the terminal voltage V was greater than 2.1±0.05V, the battery was readjusted to 20% SOC capacity at room temperature, and discharged with higher power at low temperature. If the terminal voltage V was less than 2.1±0.05V, the battery as readjusted to 20% SOC capacity at room temperature and discharged with lower power at low temperature.

(4) Test for Swelling Force of Battery

The battery was fitted into the steel plate clamp, so that the bottom and four sides of the battery abutted onto. By adjusting the steel plate with a pre-tightening force of 2000N, a pressure sensor was disposed between the steel plate clamp and the battery, connected to the computer, and after the battery was subjected to 1000 cycles the swelling force value was measured, in a unit of N.

The specific experimental parameters and performance results of Examples 1-16 and Comparative Examples 1-8 were shown in Tables 1 and 2 below.

TABLE 1

The effect of the composition of electrolyte on battery performance

| No. | Organic solvent | | Conductivity at −20° C. (mS/cm) | Cycle performance at 45° C. (Number of cycles) | Discharge power of battery core at −20° C. (W) | Swelling force after 1000 cycles (N) |
|---|---|---|---|---|---|---|
| | Composition | Mass percentage | | | | |
| Example 1 | EC/EMC/DMC | 30/60/10 | 2.65 | 1898 | 217 | 6610 |
| Example 2 | EC/EMC/DMC | 30/55/15 | 2.98 | 1900 | 229 | 6390 |
| Example 3 | EC/EMC/DMC | 25/55/20 | 3.07 | 1860 | 234 | 6230 |
| Example 4 | EC/EMC/DMC | 30/50/20 | 3.32 | 1967 | 245 | 6010 |
| Example 5 | EC/EMC/DMC | 30/45/25 | 3.40 | 2087 | 271 | 5800 |
| Example 6 | EC/EMC/DMC | 30/40/30 | 3.35 | 1987 | 257 | 5910 |
| Example 7 | EC/PC/EMC/DMC | 30/2/48/20 | 3.37 | 1613 | 250 | 9830 |
| Example 8 | EC/EMC/DMC/EA | 30/40/27/3 | 3.5 | 1814 | 275 | 7390 |
| Comparative Example 1 | EC/EMC | 30/70 | 2.21 | 1430 | 181 | 11370 |
| Comparative Example 2 | EC/EMC/DMC | 30/30/40 | 2.20 | 1086 | 171 | 14510 |
| Comparative Example 3 | EC/EMC/DMC | 30/20/50 | 1.29 | 763 | 167 | 19100 |
| Comparative Example 4 | EC/EMC/DMC | 20/60/20 | 2.82 | 1383 | 223 | 12410 |
| Comparative Example 5 | EC/EMC/DMC | 35/45/20 | 2.42 | 1319 | 189 | 9910 |
| Comparative Example 6 | EC/EMC/DMC/EA | 30/40/20/10 | 4.4 | 350 | 313 | 17830 |
| Comparative Example 7 | EC/EMC/DMC/EP | 30/40/20/10 | 4.2 | 720 | 308 | 18910 |
| Comparative Example 8 | EC/PC/EMC/DMC | 30/5/45/20 | 3.43 | 1224 | 268 | 12130 |

Comparing Examples 1-2, Examples 4-6 with Comparative Example 1, it can be seen that adding DMC to the electrolyte was beneficial to alleviating the deterioration of the charging ability caused by the increase of swelling force, thereby inhibiting the further increase of swelling force to a certain extent. Thus, the cycle performance at 45° C. was improved. However, it can be seen from Comparative Examples 2-3 that with the increase of the content of DMC, the low-temperature viscosity of the electrolyte increased, resulting in a significant decrease in conductivity at low temperature and low-temperature power. In addition, the decomposition of DMC at the positive electrode interface increased gas production, resulting in serious battery flatulence, which affected the charging ability on the battery interface, and severely deteriorated the cycle performance at 45° C.

It can be seen that when the mass percentage of DMC in the chain carbonate was controlled to be at least 9 wt % and less than 50 wt %, good low-temperature conductivity and cycle performance at 45° C. were obtained. Moreover, the amount of DMC in the chain carbonate was further controlled to be from 15 wt % to 45 wt %, more preferably from 25 wt % to 43 wt %, and better low-temperature power and cycle performance at 45° C. were obtained at the same time.

Comparing Examples 3-4 with Comparative Examples 4-5, with the increase of the amount of cyclic carbonate EC (for example, to 30%), the cycle performance at 45° C. of the battery was significantly improved. However, with the further increase of the amount of the cyclic carbonate in the organic solvent (for example, more than 32%), and the low-temperature viscosity of the electrolyte became larger, resulting in a decrease in the low-temperature conductivity of the electrolyte and the low-temperature power of the battery. At the same time, EC increased the oxidation gas production at the interface of positive electrode, resulting in that cycle gas production at 45° C. increased, which in turn deteriorated the cycle performance at 45° C. It can be seen that when EC accounted for 25 wt % to 32 wt % of organic solvents, better low-temperature power and cycle performance at 45° C. were obtained.

Comparing Example 4 and Example 7 with Comparative Example 8, it can be seen that adding a small amount of PC to the cyclic carbonate can increase the low-temperature conductivity, thereby improving the low-temperature power. However, when the PC content was further increased, the PC caused graphite to peel off, resulting in that the swelling force of the battery increased and the cycle performance deteriorated.

From Examples 6, 8 and Comparative Examples 6-7, it can be seen that with the addition of a small amount of carboxylic acid ester to the organic solvent, both the normal-temperature and low-temperature conductivity of the battery increased, while the swelling force of the battery became larger, and the cycle performance at 45° C. deteriorated significantly. The addition of carboxylic acid ester destroyed the structural stability of the SEI film, resulting in deterioration of battery cycle performance. Moreover, it can be further seen that EA affects the structural stability of the SEI film more significantly than EP, and greatly reduced the cycle performance of the battery.

TABLE 2

The impact on battery performance by improving artificial graphite and the composition of electrolyte

| No. | Negative active material | Organic solvent Composition | Mass percentage | Cycle performance at 45° C. (number of cycles) | Discharge power at −20° C. of battery core (W) | Swelling force after 1000 cycles (N) |
|---|---|---|---|---|---|---|
| Example 9 | Artificial graphite B | EC/EMC/DMC | 30/60/10 | 2598 | 185 | 4870 |
| Example 10 | Artificial graphite B | EC/EMC/DMC | 30/55/15 | 2600 | 196 | 4430 |
| Example 11 | Artificial graphite B | EC/EMC/DMC | 25/55/20 | 2534 | 195 | 4290 |
| Example 12 | Artificial graphite B | EC/EMC/DMC | 30/50/20 | 2667 | 218 | 4130 |
| Example 13 | Artificial graphite B | EC/EMC/DMC | 30/45/25 | 2687 | 246 | 4050 |
| Example 14 | Artificial graphite B | EC/EMC/DMC | 30/40/30 | 2674 | 227 | 4360 |
| Example 15 | Artificial graphite B | EC/PC/EMC/DMC | 30/2/48/20 | 2655 | 224 | 5210 |
| Example 16 | Artificial graphite B | EC/EMC/DMC/EA | 30/40/27/3 | 2530 | 242 | 3970 |

In addition to the influence of the electrolyte composition and dosage ratio on the battery performance discussed above, the inventors also surprisingly found that when using artificial graphite B, the graphite had fewer defects on surface, and breakdown and repair of the SEI film of the electrolyte on the graphite surface were reduced. At the same time, the combination of the electrolyte composition and the amount discussed above further improved the cycle performance at 45° C. and low-temperature power performance of battery.

The above mentioned descriptions only show particular implementations of the present application and but are not intended to limit the protection scope of the present application. Any modification or replacement readily figured out by a person skilled in the art within the technical scope disclosed in the present application shall fall within the protection scope of the present application. Therefore, the protection scope of the present application shall be determined by the protection scope of the claims.

What is claimed is:

1. A secondary battery comprising an electrolyte and a negative electrode plate, characterized in that,
the electrolyte comprises an organic solvent, and the organic solvent comprises a cyclic carbonate and a chain carbonate;
a mass ratio of the cyclic carbonate to the chain carbonate is from 25:75 to 32:68; the cyclic carbonate comprises ethylene carbonate and the mass percentage of the ethylene carbonate in the cyclic carbonate is more than 90 wt %, and the cyclic carbonate comprises propylene carbonate;
the chain carbonate comprises dimethyl carbonate; a mass percentage of the dimethyl carbonate in the chain carbonate is more than or equal to 9 wt % and less than 50 wt %; and
based on the total mass of the organic solvent, a mass percentage of a carboxylic acid ester in the organic solvent is less than 5 wt %; and
the negative electrode plate comprises a negative active material, the negative active material comprises an artificial graphite having a D peak intensity $I_D$ and a G peak intensity $I_G$ satisfying: $I_D/I_G \leq 0.25$ as measured by laser Raman spectroscopy.

2. The secondary battery according to claim 1, characterized in that, the mass percentage of the dimethyl carbonate in the chain carbonate is from 15 wt % to 45 wt %.

3. The secondary battery according to claim 1, characterized in that, the mass percentage of the carboxylic acid ester in the organic solvent is less than 3 wt %.

4. The secondary battery according to claim 1, characterized in that, the mass percentage of the ethylene carbonate in the cyclic carbonate is from 92% to less than 100%.

5. The secondary battery according to claim 1, characterized in that, the chain carbonate further comprises one or more of diethyl carbonate and ethyl methyl carbonate.

6. The secondary battery according to claim 1, characterized in that, the carboxylic acid ester comprises one or more of methyl acetate, ethyl acetate, propyl acetate, methyl propionate, ethyl propionate, and propyl propionate.

7. The secondary battery according to claim 1, characterized in that, the electrolyte further comprises an additive, and the additive comprises one or more of fluoroethylene carbonate, vinylene carbonate, ethylene sulfate, tris(trimethylsilyl) phosphate, lithium difluorooxalate borate, and lithium bis(fluorosulfonyl)imide.

8. The secondary battery according to claim 7, characterized in that, a total amount of the additive is no more than 10 wt %, based on the total mass of the electrolyte.

9. The secondary battery according to claim 1, characterized in that, the electrolyte has a conductivity at −20° C. of more than or equal to 2.5 mS/cm.

10. The secondary battery according to claim 1, characterized in that, the artificial graphite satisfies one or more of the following (1)-(8):
(1) the artificial graphite has a gram capacity of 350 mAh/g to 358 mAh/g;
(2) the artificial graphite has a D peak intensity $I_D$ and a G peak intensity $I_G$ satisfying: $0.1 \leq I_D/I_G \leq 0.2$, as measured by laser Raman spectroscopy;
(3) the artificial graphite negative electrode material has a number average particle size $D_n10$ of 1 μm to 3 μm, as measured with a laser particle size analyzer;

(4) the artificial graphite negative electrode material has a volume average particle size $D_v10$ of more than or equal to 6 μm, as measured with a laser particle size analyzer;
(5) the artificial graphite negative electrode material has a volume average particle size $D_v50$ of 15 μm to 20 μm, as measured with a laser particle size analyzer;
(6) the artificial graphite negative electrode material has a particle size distribution $(D_v90-D_v10)/D_v50$ of 1.1 to 1.8, as measured with a laser particle size analyzer;
(7) the artificial graphite has a specific surface area of 1.0 m²/g to 1.5 m²/g, as measured with an analysis of the specific surface area by the nitrogen adsorption;
(8) the artificial graphite has a graphitization degree G of 90% to 95%, as measured with an X-ray diffractometer.

11. The secondary battery according to claim 10, characterized in that, the negative electrode plate has a compaction density of 1.55 g/cm³ to 1.75 g/cm³; and/or the negative electrode plate has an orientation OI value of 8 to 15, preferably from 8 to 12;
wherein
the orientation OI value of the negative electrode plate is the ratio of the peak area of 004 diffraction peak to the peak area of 110 diffraction peak of the negative active material in the X-ray diffraction pattern of the negative electrode plate.

12. The secondary battery according to claim 11, characterized in that, the negative electrode plate has a compaction density of from 1.6 g/cm³ to 1.7 g/cm³; and/or the negative electrode plate has an orientation OI value of from 8 to 12.

13. The secondary battery according to claim 1, characterized in that, the secondary battery further comprises a positive electrode plate, the positive electrode plate comprises a positive active material, and the positive active material comprises one or more of lithium transition metal oxide and modified compounds thereof.

14. An apparatus, characterized in that, the apparatus comprises the secondary battery according to claim 1.

15. The secondary battery according to claim 1, characterized in that, the mass percentage of the dimethyl carbonate in the chain carbonate is from 25 wt % to 43 wt %.

16. The secondary battery according to claim 1, characterized in that, the mass percentage of the carboxylic acid ester in the organic solvent is 0 wt %.

17. The secondary battery according to claim 1, characterized in that, the carboxylic acid ester comprises one or more of ethyl acetate and ethyl propionate.

18. The secondary battery according to claim 1, characterized in that, the electrolyte has a conductivity at −20° C. of from 2.6 mS/cm to 3.5 mS/cm.

19. The secondary battery according to claim 1, characterized in that, the artificial graphite satisfies one or more of the following (1)-(8):
(1) the artificial graphite has a gram capacity of 350 mAh/g to 358 mAh/g;
(2) the artificial graphite has a D peak intensity $I_D$ and a G peak intensity $I_G$ satisfying: $0.1 \leq I_D/I_G \leq 0.2$, as measured by laser Raman spectroscopy;
(3) the artificial graphite negative electrode material has a number average particle size $D_n10$ of from 1 μm to 2 μm, as measured with a laser particle size analyzer;
(4) the artificial graphite negative electrode material has a volume average particle size $D_v10$ of from 6.5 μm to 10.5 μm, as measured with a laser particle size analyzer;
(5) the artificial graphite negative electrode material has a volume average particle size $D_v50$ of from 15 μm to 18 μm, as measured with a laser particle size analyzer;
(6) the artificial graphite negative electrode material has a particle size distribution $(D_v90-D_v10)/D_v50$ of from 1.2 to 1.5, as measured with a laser particle size analyzer;
(7) the artificial graphite has a specific surface area of 1.0 m²/g to 1.5 m²/g, as measured with an analysis of the specific surface area by the nitrogen adsorption;
(8) the artificial graphite has a graphitization degree G of from 92% to 94%, as measured with an X-ray diffractometer.

* * * * *